United States Patent [19]
Donahue

[11] Patent Number: 4,967,998
[45] Date of Patent: Nov. 6, 1990

[54] VALVE NOISE REDUCTION

[75] Inventor: Lawrence E. Donahue, Cook, Ill.

[73] Assignee: Honeywell Inc., Minneapolis, Minn.

[21] Appl. No.: 17,952

[22] Filed: Feb. 24, 1987

Related U.S. Application Data

[63] Continuation of Ser. No. 735,014, May 17, 1985, abandoned.

[51] Int. Cl.$^5$ .............................................. F16K 47/02
[52] U.S. Cl. .................................................... 251/121
[58] Field of Search ............................. 251/120, 121; 137/543.21

[56] References Cited

U.S. PATENT DOCUMENTS

| | | | |
|---|---|---|---|
| 1,297,229 | 3/1919 | Ostrander | 251/120 X |
| 1,891,324 | 12/1932 | Eheimann | 251/120 |
| 2,303,126 | 11/1942 | Sloan | 251/120 |
| 2,341,394 | 2/1944 | Sloan | 251/120 |
| 2,659,388 | 11/1953 | Raud | 251/120 |
| 3,059,894 | 10/1962 | Kuecht | 251/121 |
| 3,078,067 | 2/1963 | Engle | 251/121 |
| 3,245,429 | 4/1966 | Bacino | 137/543.21 |

FOREIGN PATENT DOCUMENTS 2032580  5/1980  United Kingdom ................ 251/121

Primary Examiner—Arnold Rosenthal
Attorney, Agent, or Firm—Donald J. Lenkszus; Robert B. Leonard

[57] ABSTRACT

In a valve having a plug and valve seat for controlling the flow of fluid between an inlet port and an outlet port, the plug has radial serrations on its bottom face and has a length for establishing turbulence during the last ¼ of its stroke as the plug is lifted from the valve seat, the flow through said valve seat being modulated by the turbulence.

8 Claims, 1 Drawing Sheet

VALVE NOISE REDUCTION

This application is a continuation of application Ser. No. 735,014, filed May 17, 1985, now abandoned.

BACKGROUND OF THE INVENTION

The present invention relates to a valve having a plug configuration which controls flow through the valve by creating turbulence in the area of the valve seat and, more particularly, to such a plug configuration which substantially eliminates noise created by or transmitted through the valve.

Valves, such as those for controlling the flow of water, have been known to transmit or create noise which is objectionable to the inhabitants of the building in which such valves are being used. For example, the heating and cooling systems of large buildings have required the use of water pumps having substantial capacity for pumping heated or cooled water to coils located in the various fan systems installed throughout the building. In these fan systems, fans blow air over the heat exchange coils. The coils, which receive the heated or cooled water from the pumps, either impart heat to or withdraw heat from the fan air depending upon whether the coil is receiving heated or cooled water. The temperature of the fan discharge air can be regulated by the amount of water supplied to the heat exchange coils under control of the water valves.

It has been the practice to couple these pumps to the water piping running throughout the building by way of flexible connections to dampen out any vibrations generated by the pumps themselves. It is becoming increasingly more common, however, to use hard connections for connecting the pumps to the pipes running throughout the building. Under such circumstances, it is not unknown for the vibrations created by the pumps to be transmitted through the piping of the building to the water valves controlling the flow of water to the various water loads in the building. It is known that vibrations generated by the pumps of a building and communicated through the piping system of the building can generate objectionable noise within the valves themselves. One way to reduce this objectionable noise is by appropriate modification of the valve.

SUMMARY OF THE INVENTION

Accordingly, noise generated by or transmitted through a fluid controlling valve can be substantially reduced by providing a valve having a low noise construction, this valve including a valve body having inlet and outlet ports so that fluid can flow there-between, a valve seat arranged within the valve body to provide communication between the inlet and outlet ports, a valve plug located to cooperate with the valve seat for controlling the flow of fluid through the valve seat between the inlet and outlet ports, the valve plug having a configuration to establish turbulence when the plug is lifted off of the valve seat, the turbulence modulating the flow and also reducing noise, and a valve stem extending through the valve body and attached to the plug for controlling the position of the plug with respect to the valve seat.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
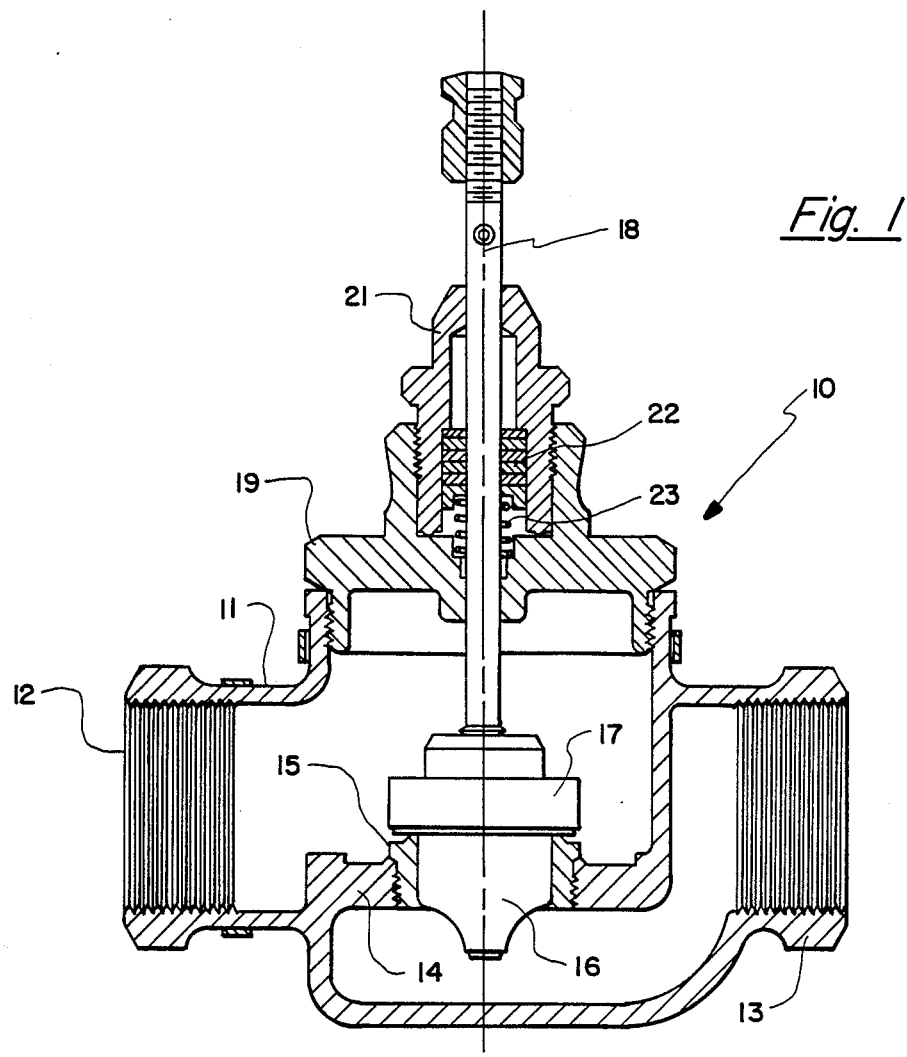
FIG. 1 shows a cross section of a plug type fluid controlling valve.

As shown in FIG. 1, valve 10 includes valve body 11 having inlet port 12 and outlet port 13. Wall 14 may be formed integrally with valve body 11 and may have an orifice to allow for communication between inlet port 12 and outlet port 13. Interior wall 14 may be constructed to form a valve seat or it may be internally threaded to receive an externally threaded valve seat 15.

Valve plug 16 together with plug holder 17 control the flow through valve seat 15 from inlet port 12 to outlet port 13. The position of plug 16 and holder 17 with respect to valve seat 15 is controlled by valve stem 18. Valve stem 18 can be driven manually or by an electric, hydraulic, pneumatic or similar actuator.

Valve stem 18 extends through bonnet 19 which is threaded into an opening in valve body 11 in fluid tight relationship. Packing gland 21 threadably engages bonnet 19 and carries packing material 22 therein which material is held in fluid tight relationship with valve stem 18 by spring 23.

This valve arrangement shown in FIG. 1 may generate or transmit noise. For example, any vibrations to which the piping connected to inlet and outlet ports 12 and 13 is subjected can induce valve 10 to generate noise which, if loud enough, can be objectionable to the inhabitants of the building in which valve 10 is located.

Figure 2:
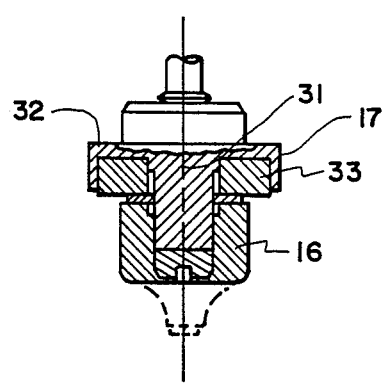
FIG. 2 shows the plug of FIG. 1 configured for creating turbulence to control the flow of fluid through the valve; and, FIG. 3 shows the bottom end of the plug having radial cuts therein for enhancing turbulence.

Accordingly, valve plug 16 as shown in FIG. 2 is configured in such a way to reduce noise which may otherwise be generated by the valve shown in FIG. 1. FIG. 2 also shows the details of the plug and plug holder assembly 16 and 17 in more detail. Plug 16 is attached to end 31 of valve stem 18. The valve stem is a subasssembly which is staked along with the remaining parts to the plug. Also attached to valve stem 18 is plug holder 32 having a disc 33 located therein which insures complete close off of valve seat 15 when plug 16 and disc 33 are driven by stem 18 into a fluid close off position.

As shown in FIG. 2, plug 16 has been shortened by the amount shown in the dashed line. The effect of a shorter plug 16 is that as plug 16 and holder 17 are lifted from valve seat 15 by a predetermined amount, turbulence in the fluid flowing between ports 12 and 13 is then created. The amount of this turbulence offers a resistance to flow and can be controlled to control the flow from inlet port 12 to outlet port 13. It has been found that it is during the last ¼ to ⅓ of travel of plug 16 as it is lifted away from valve seat 15 by valve stem 18 wherein the noise is most evident. Therefore, the length of plug 16 should be selected so that during the last ¼ to ⅓ of its travel, the control of fluid flow through valve seat 15 from inlet port 12 to outlet port 13 primarily results from turbulence.

Figure 3:
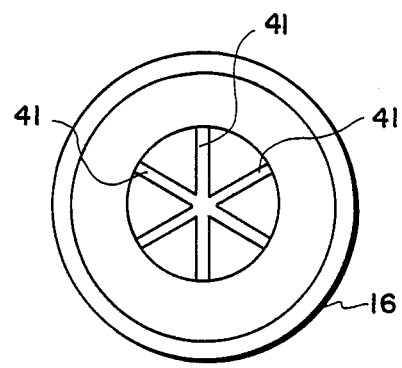

This turbulence can be enhanced by cutting radial serrations 41 such as those shown in FIG. 3 in the bottom of plug 16. These serrations 41 will enhance the turbulence generated by valve plug 16 during the last preselected portion of the valve stroke.

These modifications, i.e. selecting a plug length so that turbulence is generated over a preselected portion of valve stroke and serrations or cuts on the bottom side of the plug to enhance turbulence, do not materially effect either the flow versus stroke characteristic profile or the $C_V$ of the valve. It has been found that these modifications will substantially reduce any noise generated by or transmitted through the valve.

The embodiments of the invention in which an exclusive property or right is claimed are defined as follows:

1. A valve having a low noise construction comprising:
    a valve body having inlet and outlet ports so that fluid can flow therebetween;
    a valve seat arranged within said valve body to provide communication between said inlet and outlet ports;
    a valve plug located to cooperate with said valve seat for controlling flow through said valve seat between said inlet and outlet ports, said valve plug having a configuration to establish turbulence when said plug is lifted off said valve seat by a predetermined amount, said configuration including radial cuts on a face of said plug which is substantially perpendicular to the direction of fluid flow traveling through said valve seat, said flow being modulated by said turbulence, said configuration substantially reducing noise; and
    a valve stem extending through said body and attached to said plug for controlling the position of said plug with respect to said valve seat.

2. The valve of claim 1 wherein said valve plug has a length for establishing said turbulence when said plug is lifted off said valve seat by said predetermined amount.

3. The valve of claim 2 wherein said valve plug has a length for establishing said turbulence during said last $\frac{1}{4}$ of travel as said valve plug moves away from said valve seat.

4. A valve comprising:
    a valve body having inlet and outlet ports so that fluid can flow therebetween;
    a valve seat arranged within said valve body to provide communication between said inlet and outlet ports;
    a valve plug cooperating with said valve seat for controlling flow through said valve seat between said inlet and outlet ports, said valve plug having a configuration to establish turbulence when said plug is between a position representing a maximum distance away from said valve seat and a position representing a distance less than said maximum distance, said configuration including radial cuts on a face of said plug which is substantially perpendicular to the direction of fluid flow through said valve seat, said flow being modulated by said turbulence; and
    a valve stem extending through said body and attached to said plug for controlling the position of said plug with respect to said valve seat.

5. The valve of claim 4 wherein said valve plug has a length for establishing said turbulence when said plug is between said position representing said maximum position and said position representing a distance less than said maximum distance.

6. The valve of claim 5 wherein said valve plug has a length for establishing said turbulence during said last $\frac{1}{4}$ of travel as said valve plug moves away from said valve seat.

7. A valve having a low noise construction comprising:
    a valve body having inlet and outlet ports so that fluid can flow therebetween;
    a valve seat arranged within said valve body to provide communication between said inlet and outlet ports;
    a valve plug located to cooperate with said valve seat for controlling flow through said valve seat between said inlet and outlet ports, said valve plug having radial serrations on a face of said plug which is substantially perpendicular to the direction of fluid flow through said valve seat and a length for establishing turbulence when said plug is lifted off said valve seat by a predetermined amount, said flow being modulated by said turbulence; and
    a valve stem extending through said body and attached to said plug for controlling the position of said plug with respect to said valve seat.

8. The valve of claim 7 wherein said valve plug has a length whereby said turbulence controls said flow during the remaining $\frac{1}{4}$ of valve stroke as said plug is withdrawn from said valve seat by said valve stem.

* * * * *